July 4, 1950   F. H. BEMIS   2,513,397
WEEDLESS FISHHOOK
Filed July 27, 1944

Inventor
Fay H. Bemis
By Robert M. Dunning
Attorney

Patented July 4, 1950

2,513,397

UNITED STATES PATENT OFFICE 2,513,397

WEEDLESS FISHHOOK

Fay H. Bemis, St. Paul, Minn.

Application July 27, 1944, Serial No. 546,765

4 Claims. (Cl. 43—42.4)

My invention relates to an improvement in weedless fishhooks and resides more particularly in a barbed hook which will not catch in weeds and other under-water plants or the like.

It is the object of the present invention to provide a barbed fish hook of any desired shape having a spring wire secured to the eye end of the hook. This spring wire is provided with a looped end which resiliently engages the barb of the hook. The spring wire serves not only to prevent the point of the hook from catching in weeds or other under-water growth but also holds the bait locked upon the hook. The spring wire also protects the point of the hook so that it can not cause serious accidents during handling when trolling or casting.

A feature of the present invention resides in the fact that the resilient wire may be small in cross section and need not add materially to the bulk or weight of the hook. At the same time this wire forms a positive lock having an action somewhat similar to the action of a safety pin when the wire is engaged upon the barb of the hook.

A feature of the present invention lies in the shape of the resilient wire and the manner in which this wire may guard the point of the hook from catching in weeds or the like as it is pulled through the water. The wire preferably extends at an acute angle to the shank of the hook from the eye end thereof and extends substantially in the plane of the hook end. The wire arm preferably extends beyond the width of the curved end of the hook so as to guide weeds or other under-water growth outwardly beyond the position of the hook.

A feature of the present invention resides in the fact that the spring wire may be readily disengaged from the barb of the hook as the bait is taken by a fish, this arm being pressed inwardly in a manner to release the looped end thereof from engagement with the hook barb.

These and other objects and novel features of my invention will be more clearly and fully set forth in the following specification and claims.

In the drawings forming a part of my specification:

Figure 1:
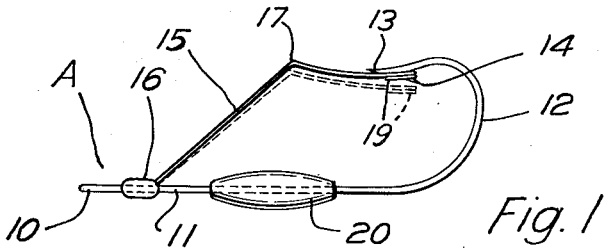
Figure 1 is an elevational view of my hook showing the spring wire in engagement with the hook barb and showing in dotted outline a released position of the spring wire.
Figure 2:
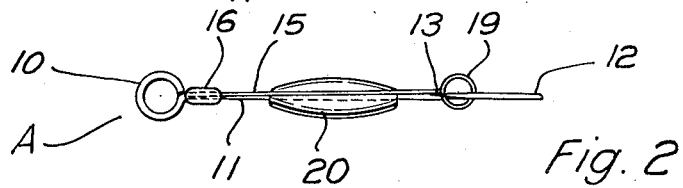
Figure 2 is a plan view of the hook showing the looped end of the spring wire.

The hook A, illustrated in Figures 1 and 2 of the drawings, is of conventional shape and is of usual design. The hook A includes an eye 10 at one end of a relatively straight shank 11. The shank 11 merges into a rounded hook end 12 which terminates in a pointed end portion 13 extending substantially parallel to the shank 11 of the hook. The point or pointed end 13 is provided with a rearwardly extending barb 14 of any usual shape, this barb projecting toward the rounded end 12 of the hook.

A spring resilient wire arm 15 is secured at 16 to the shank of the hook adjacent the eye 10. This spring wire 15 extends at an acute angle with respect to the shank 11 in substantially the plane of the rounded end 12 of the hook. In preferred form the arm 15 extends outwardly from the shank 11 a distance equal to or greater than the distance between the hook end 13 and the shank 11. As a result as the hook passes through the water and the spring arm 15 engages against a weed or other under-water growth it will guide this weed outwardly beyond the position of the hook 13.

A kink or bend 17 is provided in the wire 15 at a point spaced from the shank 11 a distance equal to or greater than the distance between the pointed hook end 13 and the shank 11. From the point 17 the wire arm is off-set to slope slightly toward the point 13. A loop 19 formed of a single convolution of wire or of a series of convolutions is provided on the end of the wire arm 15, this loop 19 being engageable with the barb 14. The spring arm 15 is bent in such a way that when the loop 19 is engaged with the barb 14, the arm 15 is under spring tension. Thus it is necessary to flex the arm 15 to some extent in order to engage the loop 19 upon the hook barb 14. When engaged upon the barb the point of the hook rests closely against the wire arm 15 and is protected thereby.

A weight 20 may be placed upon the shank 11 as illustrated if it is so desired. The specific shape of the hook, however, and the weighting thereof is not of great importance in the present invention so long as the spring arm 15 is properly adapted to engage the barb of the hook.

In the operation of my weedless hook the bait is placed upon the hook in the usual manner and the resilient arm 15 is flexed so that the loop 19 resiliently engages the barb 14. In order to engage the loop 19 upon the barb 14 it is usually necessary to flex the arm 15 toward the rounded end 12 of the hook, moving the loop 19 longitudinally of the hook.

As the hook moves through the water the spring arm may engage against a weed or other under-water growth and the shape of the arm is such as to guide the point of the hook away from such a growth. However, in the event a fish takes the bait upon the hook, the mouth of the fish closes over the light spring wire, pressing the same inwardly and disengaging the loop 19 from the barb so that the barb of the hook may be useful in preventing the escape of the fish from the hook.

Figure 3:
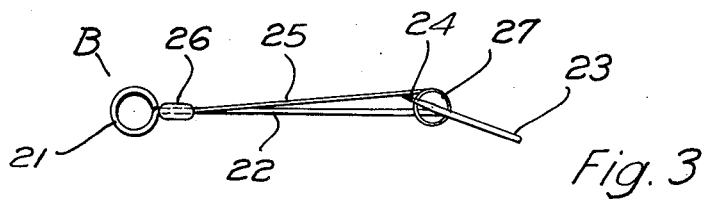
Figure 3 is a view similar to Figure 2 showing the spring arm arrangement for use with an offset style of hook.

In Figure 3 of the drawings I disclose a construction similar to that illustrated in Figures 1 and 2, but in which the rounded end of the hook is off-set angularly to the shank. The hook B is provided with an eye 21 merging into a straight shank 22. The shank 22 is bent at one end to provide the rounded end 23 similar to the rounded end 12 of the hook A. The hook end is sharpened as illustrated at 24 and a barb similar to the barb 14 is provided adjacent this pointed end.

A resilient wire 25 is anchored at 26 adjacent the eye 21 to the shank 22. The resilient arm 25 is provided with a loop end 27 which resiliently engages the barb of the hook. The construction illustrated is very similar to that illustrated in Figures 1 and 2, with the exception that in Figure 3 of the drawings the loop end 23 is off-set at an angle to the longitudinally extending shank 22. Such an off-set of the hook end is somewhat common and the spring arm is shaped to fit such a construction.

Figure 4:
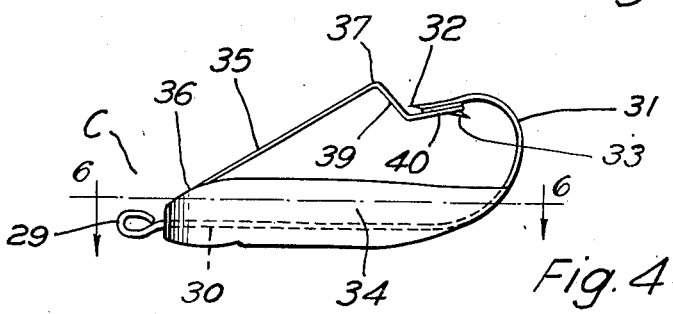
Figure 4 is a side elevational view of a slightly different form of hook.
Figure 5:
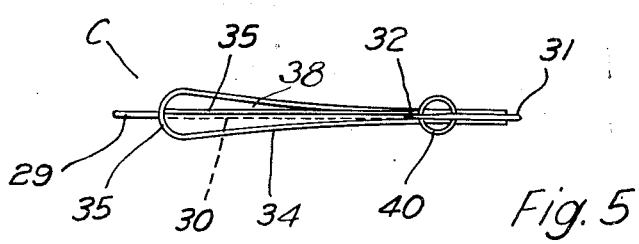
Figure 5 is a plan view of the construction illustrated in Figure 4.
Figure 6:
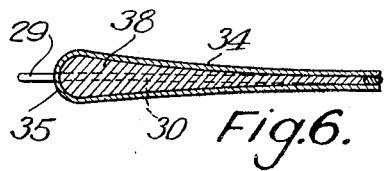
Figure 6 is a sectional view on the line 6—6 of Figure 4.

In Figures 4 and 5 of the drawings I disclose a slightly different form of hook C. This hook C is similar to the constructions previously illustrated with the exception that a lure body encircles a portion or all of the shank of the hook. The hook C is provided with a loop end 29 connected to one end of a relatively straight shank 30. The shank 30 is provided with a rounded closed end 31 which terminates in a sharp pointed hook end 32. A barb 33 projects toward the rounded end 31 of the shank and acts to support the wire arm or guide.

A body forming material such as a flat strip 34 of properly decorated material is folded upon itself at its forward end 36. The space within the strip 34 or between the sides of the fold thus formed may be filled with any suitable material to form a lure body. For example, the strip 34 may be of shiny metal and may enclose a wax or plastic body 38 which embeds the hook shank 30.

A resilient arm 35 is secured at its forward end 36 to the lure body and extends outwardly at an acute angle with the shank 30 to a point spaced from the shank 30 a distance greater than the distance between the hook point 32 and the shank 30. The resilient wire 35 is then bent at 37 to provide an off-set portion 39 terminating in a looped end 40. The looped end 40 may comprise one or more convolutions of wire or may comprise any type of closed loop.

The arm 35 is so designed that the bend 37 thereof and the portion of the wire arm between the bend 37 and the anchor 36 guide weeds or other undergrowth away from the point of the hook. The loop 40 engages the barb 33 with a resilient action, thus locking the guard to the hook point. However, the resilient arm 35 may be readily disengaged from the hook barb by the inward pressure of the jaws of a fish taking the bait or attempting to swallow the lure.

It will be seen that the point of the hook is at all times protected not only during the travel of the hook through the water, but also during casting and handling of the hook. Serious accidents sometimes occurring through careless use of an unprotected hook point may be avoided with my construction. The resilient engagement between the spring loop and the hook barb serves not only to hold the spring arm in proper relation to the hook, but also to provide a detachable engagement between these elements. It will be noted that with this construction a finer wire may be employed as a guide due to the fact that the free end of the wire guard is held in proper position by the barb of the hook.

In accordance with the patent statutes, I have described the principles of construction and operation of my weedless fish hook, and while I have endeavored to set forth the best embodiments thereof, I desire to have it understood that obvious changes may be made within the scope of the following claims without departing from the spirit of my invention.

I claim:

1. A fish hook comprising a shank, a hook end at one end of said shank, a barbed point on said hook end, a spring wire secured to the other end of said shank and a spirally wound looped end on said spring wire resiliently encircling the barb of said hook.

2. A fish hook comprising a shank, a rounded hook end on one end of said shank, a pointed end on said hook end, a barb spaced from said pointed end, a spring wire secured to said shank adjacent the other end thereof, a spirally wound loop on the free end of said wire, said loop positioned to resiliently encircle the barb of the hook.

3. A weedless hook comprising an elongated shank having a curved end the plane of which is angularly disposed with respect to said shank, a point on said hook end, a barb adjacent said point, a spring wire arm resiliently secured to the other end of said shank, and a spirally wound loop end on said resilient arm resiliently encircling said barb.

4. A fish hook comprising a shank, a hook end at one end of said shank, a barbed point on said hook end, a spring wire secured to the other end of said shank, a spirally wound looped end on said spring wire resiliently encircling the barb of the hook, a lure body encircling a portion of the shank of the hook, said lure body including an elongated strip bent double at its forward end to form a forward rounded body end, the ends on said strip being bent into parallel relation, said hook shank extending through the forward rounded end of said strip, and filling material between the ends of said strip embedding the hook or shank of said hook.

FAY H. BEMIS.

REFERENCES CITED

The following references are of record in the file of this patent:

UNITED STATES PATENTS

| Number | Name | Date |
|---|---|---|
| 712,032 | Baker | Oct. 28, 1902 |
| 713,306 | Jacoby | Nov. 11, 1902 |
| 755,677 | Krus | Mar. 29, 1904 |
| 823,460 | Bingenheimer | June 12, 1906 |
| 859,045 | Burke | July 2, 1907 |
| 973,479 | Cooper | Oct. 25, 1910 |
| 1,513,011 | Russell | Oct. 28, 1924 |

FOREIGN PATENTS

| Number | Country | Date |
|---|---|---|
| 21,172 | Great Britain | of 1903 |